(12) United States Patent
Zhang et al.

(10) Patent No.: US 10,911,790 B2
(45) Date of Patent: Feb. 2, 2021

(54) LIVE VIDEO PUSH METHOD, DEVICE, STORAGE MEDIUM, AND PROGRAM PRODUCT

(71) Applicant: TENCENT TECHNOLOGY (SHENZHEN) COMPANY LIMITED, Guangdong (CN)

(72) Inventors: Xiang Zhang, Shenzhen (CN); Xiao Jun Yin, Shenzhen (CN); Yu Qi Cai, Shenzhen (CN); Zi He Dai, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/279,021

(22) Filed: Feb. 19, 2019

(65) Prior Publication Data
US 2019/0182514 A1 Jun. 13, 2019

Related U.S. Application Data

(63) Continuation of application No. PCT/CN2017/095448, filed on Aug. 1, 2017.

(30) Foreign Application Priority Data

Dec. 7, 2016 (CN) .......................... 2016 1 1117299

(51) Int. Cl.
*G06F 3/00* (2006.01)
*G06F 13/00* (2006.01)
(Continued)

(52) U.S. Cl.
CPC ....... *H04N 21/2187* (2013.01); *H04N 21/231* (2013.01); *H04N 21/235* (2013.01);
(Continued)

(58) Field of Classification Search
None
See application file for complete search history.

(56) References Cited

U.S. PATENT DOCUMENTS 6,539,545 B1 * 3/2003 Dureau .............. H04N 7/17336
348/14.07
9,288,543 B2 * 3/2016 Jones ..................... H04H 60/52
(Continued)

FOREIGN PATENT DOCUMENTS

CN 101969551 A 2/2011
CN 102172035 A 8/2011
(Continued)

OTHER PUBLICATIONS

Communication dated Apr. 1, 2019 issued by the State Intellectual Property Office of People's Republic of China in counterpart application No. 201611117299.4.
(Continued)

*Primary Examiner* — William J Kim
(74) *Attorney, Agent, or Firm* — Sughrue Mion, PLLC

(57) ABSTRACT

A method and an apparatus for pushing a live broadcast video are provided. The method includes obtaining plural live broadcast videos related to a live broadcast theme, the live broadcast videos including live broadcast videos enabled after a participation entrance of the live broadcast theme is triggered. Tags of the plurality of live broadcast videos are obtained. The tags correspond to video display locations on a live broadcast theme page of the live broadcast theme in a one-to-one correspondence. The tags are added to the live broadcast videos. A live broadcast video to which the tags have been added is selected as a target live broadcast video. The selected target live broadcast video is pushed to the live broadcast theme page in real-time, the
(Continued)

target live broadcast video being played at a corresponding display location on the live broadcast theme page.

20 Claims, 9 Drawing Sheets

(51) Int. Cl.
*H04N 5/445* (2011.01)
*H04N 21/2187* (2011.01)
*H04N 21/258* (2011.01)
*H04N 21/231* (2011.01)
*H04N 21/84* (2011.01)
*H04N 21/235* (2011.01)
*H04N 21/2668* (2011.01)
*H04N 21/6543* (2011.01)

(52) U.S. Cl.
CPC ... *H04N 21/25841* (2013.01); *H04N 21/2668* (2013.01); *H04N 21/6543* (2013.01); *H04N 21/84* (2013.01)

(56) References Cited

U.S. PATENT DOCUMENTS

| | | | | |
|---|---|---|---|---|
| 2002/0059184 A1* | 5/2002 | Ilan | | G06Q 30/02 |
| 2002/0067376 A1* | 6/2002 | Martin | | G06Q 30/02 |
| | | | | 715/810 |
| 2008/0168383 A1* | 7/2008 | Tallapaneni | | H04L 12/4625 |
| | | | | 715/781 |
| 2012/0303834 A1* | 11/2012 | Adam | | H04N 21/6377 |
| | | | | 709/231 |
| 2013/0283318 A1* | 10/2013 | Wannamaker | | H04H 20/30 |
| | | | | 725/56 |
| 2016/0094501 A1 | 3/2016 | Lee et al. | | |
| 2017/0257646 A1* | 9/2017 | Wu | | H04N 21/23406 |
| 2017/0303005 A1* | 10/2017 | Shen | | G11B 27/322 |
| 2019/0281327 A1* | 9/2019 | Li | | H04N 21/4884 |

FOREIGN PATENT DOCUMENTS

| | | | | |
|---|---|---|---|---|
| CN | 102457780 A | | 5/2012 | |
| CN | 104735552 A | | 6/2015 | |
| CN | 106021478 A | * | 10/2016 | |
| CN | 106021478 A | | 10/2016 | |
| CN | 106066863 A | | 11/2016 | |
| CN | 106131584 A | | 11/2016 | |
| CN | 106162248 A | | 11/2016 | |
| CN | 106792081 A | | 5/2017 | |
| WO | WO-2011113380 A2 | * | 9/2011 | G11B 27/322 |

OTHER PUBLICATIONS

Written Opinion for PCT/CN2017/095448 dated Nov. 9, 2017 [PCT/ISA/237].

Communication dated Aug. 20, 2019, from the State Intellectual Property Office of the P.R. of China in counterpart Application No. 201611117299.4.

International Search Report for PCT/CN2017/095448 dated Nov. 9, 2017 [PCT/ISA/210].

* cited by examiner

| Room identifier | Activity name | Anchor nickname | Anchor account number | Recorded video status | Room configuration status | Live broadcast status of the room | Geographic location | Total quantity of likes for the room | Total quantity of awards for the room | Total quantity of online persons in the room | Quantity of historical audiences in the room | Start time | End time | Room right | Live broadcast cover | Recommendation location |
|---|---|---|---|---|---|---|---|---|---|---|---|---|---|---|---|---|
| 0001 | qixi | Lily | 2001 | Normal | Newly added | Playback | | 1032 | 0 | 16 | 50 | 10.01 22:11:55 | 10.01 22:26:12 | Publish |  | ☐1 ☐2 ●3 Confirm |
| 0002 | qixi | Tom | 5010 | Normal | Newly added | Playback | | 0 | 0 | 1 | 3 | 10.01 22:10:52 | 10.01 22:11:24 | Publish |  | ●1 ☐2 ☐3 Confirm |
| 0003 | qixi | Jack | 3002 | Transcoding | Newly added | Playback | | 16 | 0 | 10 | 17 | 10.01 22:10:52 | 10.01 22:11:24 | Publish |  | ☐1 ☐2 ●3 Confirm |
| 0004 | qixi | Joe | 2005 | Normal | Newly added | Playback | | 8 | 0 | 6 | 51 | 10.01 22:10:35 | 10.01 22:30:35 | Publish |  | ☐1 ☐2 ●3 Confirm |

FIG. 2D

| Room identifier | Room name | Activity name | Anchor nickname | Anchor account number | Recorded video status | Room configuration status | Live broadcast status of the room | Geographic location | Total quantity of likes for the room | Total quantity of awards for the room | Total quantity of online persons in the room | Quantity of historical audiences in the room | Start time | End time | Room right | Live broadcast cover | Publishing confirmation |
|---|---|---|---|---|---|---|---|---|---|---|---|---|---|---|---|---|---|
| 0001 | | qixi | Lily | 2001 | Normal | Newly added | Playback | | 1032 | 0 | 16 | 50 | 10.01 22:11:55 | 10.01 22:26:12 | Publish | | Room found by using the activity name and the recommendation location may be published |
| 0003 | | qixi | Jack | 3002 | Transcoding | Newly added | Playback | | 16 | 0 | 10 | 17 | 10.01 22:10:52 | 10.01 22:11:24 | Publish | | Room found by using the activity name and the recommendation location may be published |
| 0004 | | qixi | Joe | 2005 | Normal | Newly added | Playback | | 8 | 0 | 6 | 51 | 10.01 22:10:35 | 10.01 22:30:35 | Publish | | Room found by using the activity name and the recommendation location may be published |

FIG. 2E

| Configured activity qixi | | | | |
|---|---|---|---|---|
| Quantity of reviewed videos | 10 | | | Whether a live broadcast has priority |
| Tag ID | Tag name | Sorting policy | Sorting dimension | |
| 1 | Tag 1 | Descending order ▼ | Sorting according to newest publishes of rooms ▼ | ✓ |
| 2 | Tag 2 | Descending order ▼ | Sorting according to newest publishes of rooms ▼ | ✓ |
| 3 | Tag 3 | Descending order ▼ | Sorting according to newest publishes of rooms ▼ | ✓ |
| | | | Close | Confirm |

FIG. 2F

LIVE VIDEO PUSH METHOD, DEVICE, STORAGE MEDIUM, AND PROGRAM PRODUCT

CROSS-REFERENCE TO RELATED APPLICATIONS

This application is a continuation of International Patent Application No. PCT/CN2017/095448, filed on Aug. 1, 2017, which claims priority from Chinese Patent Application No. 201611117299.4, filed with the Chinese Patent Office on Dec. 7, 2016 and entitled "METHOD AND APPARATUS FOR PUSHING LIVE BROADCAST VIDEO", the entire contents of each of which are incorporated by reference herein in their entirety.

BACKGROUND

1. Field

This application relates to the field of computer technologies, and in particular, to a method and an apparatus for pushing a live broadcast video, a storage medium, and a program product.

2. Description of Related Art

With development of the Internet, live broadcast videos have attracted more attention, and live broadcast themes related to the live broadcast videos also increase. To prompt popularization of the live broadcast themes, live broadcast videos related to the live broadcast themes may also be pushed to display on a live broadcast theme page.

During related art live broadcast theme operation, a live broadcast background pushes a live broadcast video of a pre-cast anchor to a live broadcast theme page for display. During implementation, a live broadcast theme planner makes appointments with anchors first, and presets corresponding locations of account numbers of the anchors on the live broadcast theme page. When these anchors enable live broadcasts after triggering a participation entrance of the live broadcast theme, the live broadcast background pushes live broadcast videos of the live broadcasts enabled by the anchors and the account numbers of the anchors to the live broadcast theme page, and displays these live broadcast videos at the display locations corresponding to the account numbers of the anchors on the live broadcast theme page.

A common user may also trigger the participation entrance of the live broadcast theme to enable a live broadcast, but only the live broadcast videos of the pre-cast anchors can be added to the live broadcast theme page currently. Consequently, the pushed live broadcast videos are relatively limited, and a live broadcast video push rate is relatively low, causing the low live broadcast theme operation efficiency.

SUMMARY

It is an aspect to provide a method and an apparatus for pushing a live broadcast video, and a storage medium to resolve a problem in the related art technology of the low live broadcast theme operation efficiency caused by relatively limited pushed live broadcast videos and a relatively low live broadcast video push rate because a common user may also trigger a participation entrance of a live broadcast theme to enable a live broadcast, but only live broadcast videos of pre-cast anchors can be added to a live broadcast theme page currently According to an aspect of one or more embodiments, there is provided a method including obtaining plural live broadcast videos related to a live broadcast theme, the live broadcast videos including live broadcast videos enabled after a participation entrance of the live broadcast theme is triggered. Tags of the plurality of live broadcast videos are obtained. The tags correspond to video display locations on a live broadcast theme page of the live broadcast theme in a one-to-one correspondence. The tags are added to the live broadcast videos. A live broadcast video to which the tags have been added is selected as a target live broadcast video. The selected target live broadcast video is pushed to the live broadcast theme page in real-time, the target live broadcast video being played at a corresponding display location on the live broadcast theme page.

According to other aspects of one or more embodiments, there is also provided an apparatus and a computer-readable storage medium consistent with the method.

BRIEF DESCRIPTION OF THE DRAWINGS

Embodiments will be described below with reference to the accompanying drawings, in which:

FIG. 2D is a schematic diagram of a review interface displayed on a management platform according to an embodiment of this application;

FIG. 2E is a schematic diagram of a push page according to an embodiment of this application;

FIG. 2F is a schematic diagram of configuring a push rule for a tag according to an embodiment of this application;

DETAILED DESCRIPTION

Figure 1:
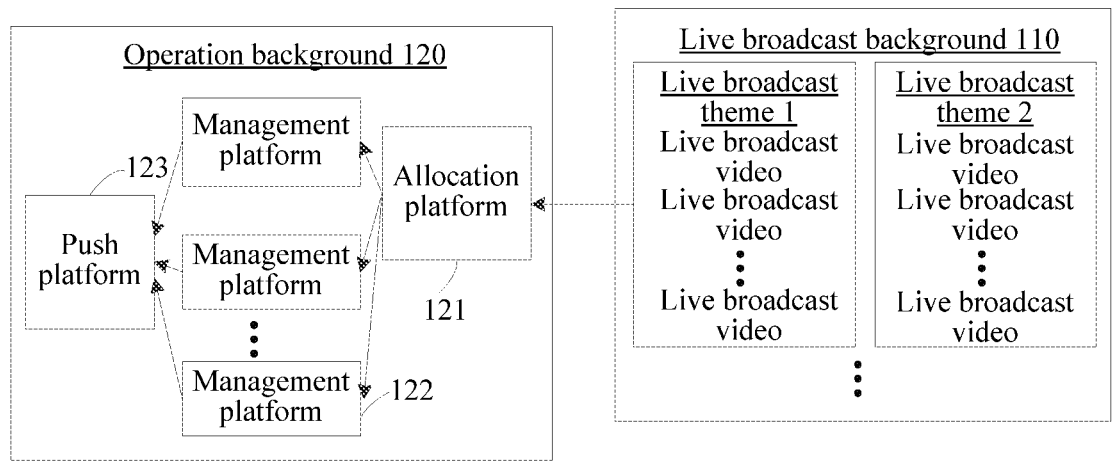
FIG. 1 is a schematic diagram of a system of a method for pushing a live broadcast video according to some embodiments of this application.

To make the objectives, technical solutions, and advantages of this application clearer, the following further describes the implementations of this application in detail with reference to the accompanying drawings.

In a live broadcast application scenario, a live broadcast background or an operation background may provide some live broadcast themes, such as a song contest, delicacy cooking, and a New Year's day activity, to users. To improve popularization of the live broadcast themes, live broadcast videos related to the live broadcast themes may be added to live broadcast theme pages related to the live broadcast themes.

In a related art manner of adding a live broadcast video to a live broadcast theme page, a live broadcast theme planner needs to make appointments with anchors, and presets corresponding locations of account numbers of the anchors on the live broadcast theme page. When these anchors participate in a live broadcast theme and enable live broadcasts, the live broadcast background pushes live broadcast videos of the live broadcasts enabled by the anchors and the account numbers of the anchors to the live broadcast theme page, and the live broadcast theme page displays these live broadcast videos at display locations corresponding to the account numbers of the anchors on the live broadcast theme page. Because common users are uncontrollable, common users who participate in the live broadcast theme cannot be learned of in advance. Only the live broadcast video of the pre-cast anchor can be added to the live broadcast theme page, and a live broadcast video of a common user cannot be added to the live broadcast theme page. Consequently, participation of common users is relatively low and real-time operation of live broadcast videos related to the live broadcast theme cannot be implemented.

The technical solutions provided in the embodiments of this application have the following beneficial effects:

A tag is added to each live broadcast video related to the live broadcast theme, the screened-out target live broadcast video added with the tag is pushed to the live broadcast theme page in real-time, and the target live broadcast video is played at the video display location corresponding to the tag of the live broadcast video on the live broadcast theme page. Each live broadcast video of a live broadcast related to the live broadcast theme may be added with the tag, and each live broadcast video added with the tag may be pushed to the live broadcast theme page in real-time. Therefore, it is ensured that any live broadcast video of the live broadcast theme participated by any common user may be added to the live broadcast theme page, so that a live broadcast video push rate is improved, thereby implementing high-efficient and real-time operation of live broadcast content In the embodiments of this application, the operation background may obtain all live broadcast videos related to the live broadcast theme from the live broadcast background. A reviewer of the operation background reviews the live broadcast videos, and adds, according to review statuses, tags corresponding to display locations on the live broadcast theme page to the live broadcast videos. When the live broadcast videos added with the tags are pushed to the live broadcast theme page, the live broadcast videos may be played at the display locations corresponding to the tags on the live broadcast theme page. The operation background may obtain live broadcast videos enabled by common users when the common users participate in the live broadcast theme, and each of these live broadcast videos has a chance to be reviewed by the reviewer of the operation background and be added with a tag corresponding to a display location on the live broadcast theme page. All the live broadcast videos that are added with tags and that are pushed to the live broadcast theme page are displayed at corresponding display locations on the live broadcast theme page. Therefore, in the manner provided in this application, there is no need to pre-cast an anchor, thereby improving high-efficient and real-time operation of live broadcast content.

In an actual application, on the operation background, the reviewer needs to add tags to live broadcast videos according to video content of the live broadcast videos, and push personnel need to select a live broadcast video that is added with the tag and that is to be pushed to the live broadcast theme page. Therefore, the operation background may be a device having an information display function and a video play function and providing an operation function to background personnel. In an implementation, the operation background may be a device having an information display function and a video play function and providing an operation function to background personnel. In another implementation, for ease of operations of background personnel and to improve operation efficiency, the operation background may further be a cluster including several devices. For details, refer to FIG. 1.

FIG. 1 is a schematic diagram of a system of a method for pushing a live broadcast video according to some embodiments of this application. The system may include a live broadcast background 110 and an operation background 120.

A user applies, by using an account number of the user, to enable a live broadcast on the live broadcast background 110. After receiving the request that is for enabling a live broadcast and that is of the account number of the user, the live broadcast background 110 allocates a live broadcast room to the account number of the user, so that other users may enter the live broadcast room to watch a live broadcast video provided by the user.

The operation background 120 is connected to the live broadcast background 110, so that the operation background 120 may receive a live broadcast video that is related to a live broadcast theme and that is pushed by the live broadcast background 110.

The operation background 120 may include an allocation platform 121, at least one management platform 122, and a push platform 123.

The allocation platform 121 is connected to the management platform 122, so that the allocation platform 121 may allocate a live broadcast video received from the live broadcast background 110 to each management platform 122.

The management platform 122 displays the allocated live broadcast video, and receives a processing operation, such as tag addition, performed by a reviewer for the live broadcast video. The management platform 122 may be a preset platform.

The push platform 123 is connected to all the management platforms 122, and summarizes live broadcast videos processed by the management platforms 122. Push personnel screen and push the live broadcast videos summarized by the push platform 123.

In some embodiments, alternatively, no independent push platform 123 may be set in the operation background 120. For example, one of the management platforms 122 may be used as the push platform, and information of other management platforms 122 are summarized to the push platform.

In some embodiments, the operation background 120 may include only one management platform 122. In this case, no independent push platform 123 may be set in the operation background, and the management platform 122 is used as the push platform.

The method for pushing a live broadcast video is described below with reference to the system in FIG. 1 and a flowchart shown in FIG. 2A.

Figure 2A:
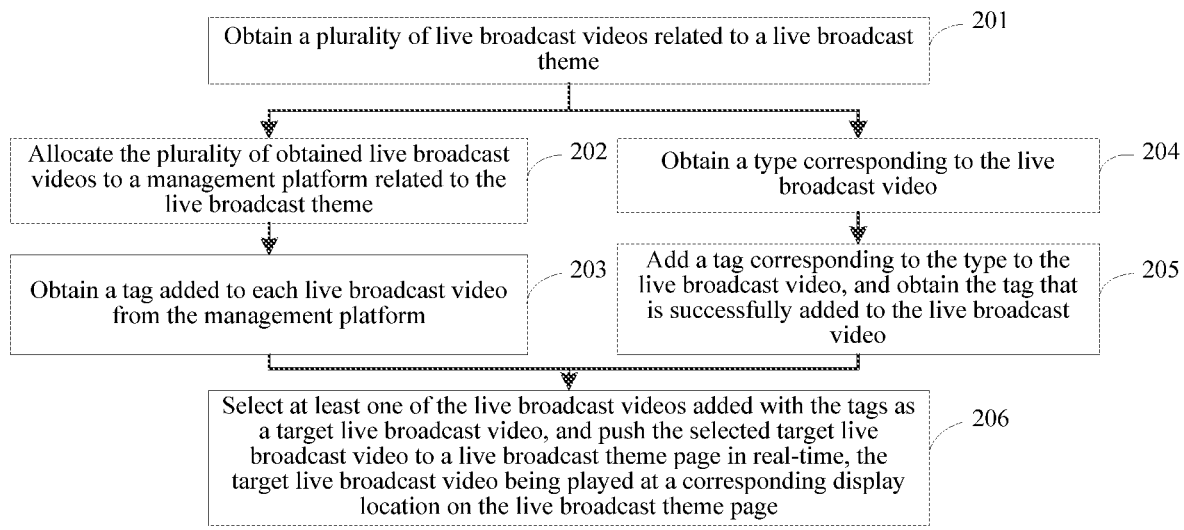
FIG. 2A is a flowchart of a method for pushing a live broadcast video according to an embodiment of this application.

FIG. 2A is a flowchart of a method for pushing a live broadcast video according to an embodiment of this application. The method for pushing a live broadcast video may be applied to the operation background 120 shown FIG. 1, and the method for pushing the live broadcast video may include the following steps:

Step 201: Obtain a plurality of live broadcast videos related to a live broadcast theme.

Generally, the live broadcast theme provided by the live broadcast background or the operation background may provide a participation entrance. A user may enter the live broadcast theme after triggering the participation entrance. When the user enables a live broadcast, the live broadcast background allocates a live broadcast room to the user, and a live broadcast video enabled in the live broadcast room has an identifier of the live broadcast theme. That is, the live broadcast video related to the live broadcast theme herein refers to the live broadcast video enabled by the user when the user triggers the participation entrance of the live broadcast theme and participates in the live broadcast theme, and the live broadcast video carries the identifier of the live broadcast theme.

In an implementation, after the live broadcast background pushes the live broadcast videos related to the live broadcast theme to the operation background, and the operation background may obtain the live broadcast videos related to the live broadcast theme. In another implementation, the operation background may send an obtaining request carrying the identifier of the live broadcast theme to the live broadcast background. After receiving the obtaining request, the live broadcast background feeds back the live broadcast videos having the identifier of the live broadcast theme. Correspondingly, the operation background may receive the live broadcast videos related to the live broadcast theme that are fed back by the live broadcast background.

In an actual application, the live broadcast video may include description information related to the live broadcast video and video content of the live broadcast video. The video content includes frames of images in the live broadcast video.

Herein, the description information is information used to define related characteristics of the live broadcast video, for example, the identifier of the live broadcast theme corresponding to the live broadcast video, an identifier of a live broadcast room, an account number of an anchor, a nickname of the anchor, a live broadcast status of the room, a start time, duration, a quantity of historical audiences in the room, a total quantity of online persons in the room, a total quantity of awards for the room, and a total quantity of likes for the room. Because the live broadcast video obtained by the operation background may be a video that is already broadcast, that is, the pushed live broadcast video may be a video stream that is already broadcast. In this case, the description information of the live broadcast video may further include an end time. The account number of the anchor herein is an account number of a user who enables the live broadcast room.

In some embodiments, when the live broadcast background sends the live broadcast videos related to the live broadcast theme to the operation background, the allocation platform of the operation background may obtain these live broadcast videos sent by the live broadcast background.

After obtaining the live broadcast videos related to the live broadcast theme, the operation background may further obtain a plurality of tags of the plurality of live broadcast videos, and respectively add the plurality of tags to the plurality of live broadcast videos. In an implementation, the tags may be added to the live broadcast videos related to the live broadcast theme in a manual review manner. For this manner, refer to implementations of step 202 and step 203.

Step 202: Allocate the plurality of obtained live broadcast videos to a management platform related to the live broadcast theme.

Because a quantity of live broadcasts enabled by users participating in the live broadcast theme may be very large, to review each live broadcast as soon as possible, after obtaining the live broadcast videos related to the live broadcast theme, the operation background (or the allocation platform of the operation background) may allocate the live broadcast videos to at least one preset management platform related to the live broadcast theme. The management platform herein is used to provide a function for adding a tag to the allocated live broadcast video. Reviewers on management platforms review the live broadcast videos allocated to the management platforms in parallel, thereby improving the operation efficiency.

In an actual application, the operation background may operate a plurality of live broadcast themes at the same time. Therefore, the operation background may preset a management platform related to the live broadcast theme for each live broadcast theme. In this way, when obtaining a live broadcast video related to the live broadcast theme, the operation background may allocate the live broadcast video to the preset management platform related to the live broadcast theme. Because different live broadcast themes generally correspond to different management platforms, work division and cooperation for live broadcast videos of different live broadcast themes is implemented. In addition, because live broadcast videos of a same live broadcast theme may also be allocated to different management platforms, work division and cooperation for live broadcast videos of a same live broadcast theme may be implemented.

Figure 2B:
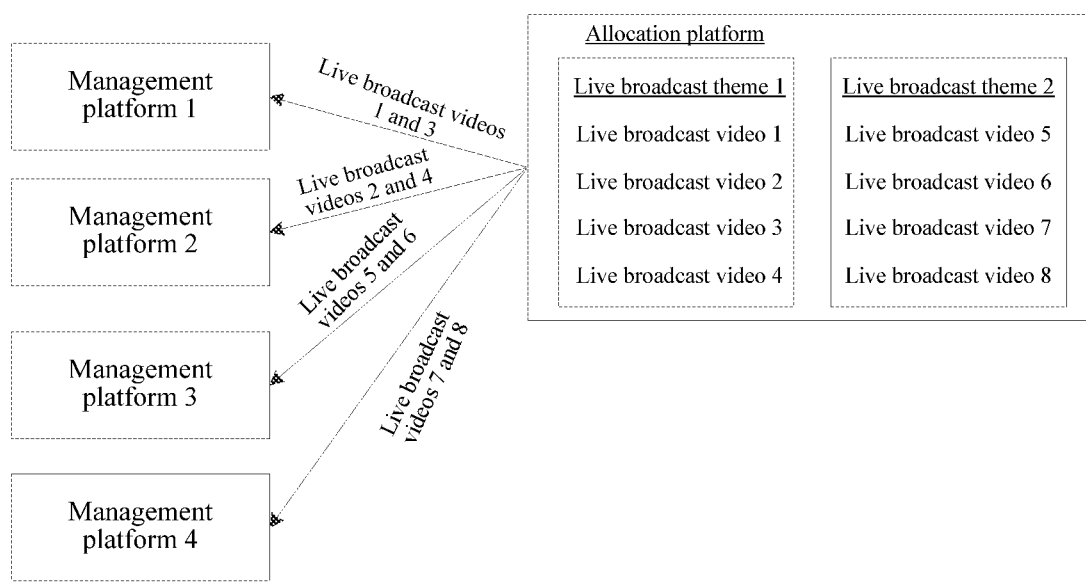
FIG. 2B is a schematic diagram of live broadcast video allocation according to an embodiment of this application.

Referring to FIG. 2B, FIG. 2B is a schematic diagram of live broadcast video allocation according to an embodiment of this application. An operation background obtains live broadcast videos related to live broadcast themes from a live broadcast background. For each live broadcast theme, the live broadcast video related to the live broadcast theme is allocated to a preset management platform related to the live broadcast theme. In FIG. 2B, a management platform 1 and a management platform 2 are management platforms configured for a live broadcast theme 1, and a management platform 3 and a management platform 4 are management platforms configured for a live broadcast theme 2. A live broadcast video 1 and a live broadcast video 3 that are related to the live broadcast theme 1 are allocated to the management platform 1, and a live broadcast video 2 and a live broadcast video 4 that are related to the live broadcast theme 1 are allocated to the management platform 2. A live broadcast video 5 and a live broadcast video 6 that are related to the live broadcast theme 2 are allocated to the management platform 3, and a live broadcast video 7 and a live broadcast video 8 that are related to the live broadcast theme 2 are allocated to the management platform 4.

Obviously, for a same live broadcast theme, live broadcast videos allocated to different management platforms that correspond to the live broadcast theme are different. In this way, it may be ensured that the live broadcast videos reviewed by reviewers on the management platforms are different.

In some embodiments, the live broadcast videos allocated to the management platforms are reviewed by the reviewers, and work efficiency of the reviewers is relatively close. Therefore, generally, quantities of live broadcast videos allocated to preset management platforms related to the live broadcast theme are relatively even. That is, an allocation platform of the operation background may evenly allocate the live broadcast videos related to the live broadcast theme to the preset management platforms related to the live broadcast theme.

Generally, a quantity of live broadcasts participating in the live broadcast theme is relatively large. However, some live broadcast video carries relatively little information. For example, some anchors only opens cameras after enabling live broadcasts and do not interact with users entering the live broadcasts. For such live broadcasts, generally, a quantity of online persons is relatively small, and a quantity of likes and a quantity of awards is also relatively small. Live broadcast videos of such live broadcasts are generally not considered to be added to the live broadcast theme page. Therefore, to save working time of the reviewers and improve the efficiency of real-time operation, the operation background may either not allocate the live broadcast videos of such live broadcasts to the reviewers on the management platforms. Therefore, in an implementation, when allocating the obtained live broadcast videos to the at least one preset management platform related to the live broadcast theme, the operation background may first sort the plurality of obtained live broadcast videos related to the live broadcast theme, and allocate a preset quantity of live broadcast videos ranked high to the at least one preset management platform related to the live broadcast theme.

In some embodiments, the operation background may obtain reference values through calculation for the live broadcast videos according to at least one parameter of a total quantity of likes, a total quantity of online persons, a total quantity of awards, and live broadcast duration for the live broadcast videos of the live broadcasts, and sort the live broadcast videos related to the live broadcast theme according to the reference values for the live broadcast videos related to the live broadcast theme.

For example, weights may be set for the parameters for calculating the reference value, each parameter of the live broadcast video is multiplied by a corresponding weight, and a sum of products is used as the reference value of the live broadcast video.

Generally, the reference value of the live broadcast video ranked high is greater than the reference value of the live broadcast video ranked low. The reference value is respectively in positive correlations with the parameters such as the total quantity of likes, the total quantity of online persons, the total quantity of awards, and the live broadcast duration. For example, when other parameters are the same, if the total quantity of likes is higher, the corresponding parameter is higher. For another example, when other parameters are the same, if the total quantity of online users is higher, the corresponding reference value is higher.

After sorting the live broadcast videos related to the live broadcast theme, the allocation platform of the operation platform may allocate a preset quantity of live broadcast videos ranked high to the at least one preset management platform related to the live broadcast theme. A possible value of the preset quantity is 1000, 1400, 2000, or the like.

The preset quantity herein may be preset according to factors such as a quantity of preset management platforms related to the live broadcast theme, the working efficiency of the reviewer (a quantity of live broadcast videos reviewed within unit duration), and duration of an activity corresponding to the live broadcast theme. For example, when the quantity of management platforms is relatively large, a quantity of configured reviewers is also relatively large. In this case, more live broadcast videos may be allocated to the management platform. Therefore, the preset quantity may be set to be greater. For another example, the working efficiency of the reviewer is determined according to historical review records of the reviewer, and the preset quantity of live broadcast videos is appropriately set according to the working efficiency of the reviewer on the management platform related to the live broadcast theme. For another example, a total quantity of live broadcast videos that may be reviewed by the receiver within the duration according to working efficiency of the reviewer and the duration of the activity corresponding to the live broadcast theme, so as to determine the preset quantity that needs to be configured.

Step 203. Obtain a tag added to each live broadcast video from the management platform.

The reviewer on the management platform may review the live broadcast videos related to the live broadcast theme that are allocated to the management platform, to add corresponding tags to these live broadcast videos. Correspondingly, the operation background may obtain the tags added for these live broadcast videos. The tags herein and display locations on a live broadcast theme page are in a one-to-one correspondence. The display location on the live broadcast theme page may be considered as a recommendation location. Recommendation locations and the tags are in a one-to-one correspondence.

After the live broadcast videos related to the live broadcast theme are allocated to the management platform, the management platform may display the allocated live broadcast videos related to the live broadcast theme.

Figure 2C:
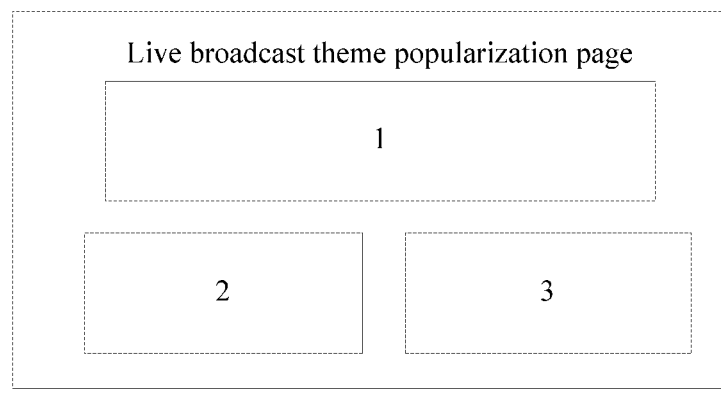
FIG. 2C is a schematic diagram of display locations on a live broadcast theme page according to an embodiment of this application.

To help the reviewer to add the tags to the live broadcast videos, when displaying these live broadcast videos, the management platform may further display preset tag options at the display locations of the live broadcast videos. Generally, the display location for playing the live broadcast video is set on the live broadcast theme page corresponding to the live broadcast theme. Each display location corresponds to a tag. Values of tags may be different according to description information of display locations corresponding to the tags. For example, the values of the tags may be 1, 2, and 3. Referring to FIG. 2C, when the value of the tag is 1, the corresponding display location is a location in a first row in FIG. 2C; when the value of the tag is 2, the corresponding display location is a first location in a second row in FIG. 2C; and when the value of the tag is 3, a corresponding display location is a second location in a second row in FIG. 2C.

Obviously, the tag may alternatively be another value. For example, if the live broadcast theme is a song contest, the tag may be a folk song, a popular song, a classical song, or the like. For another example, if the live broadcast theme is delicacy cooking, the tag may be a fired dish, a soup, a dessert, or the like.

For each live broadcast video, after a tag confirmation control corresponding to the live broadcast video is triggered, the management platform obtains the tag corresponding to the tag option selected for the live broadcast video.

In an actual application, to help the reviewer to add an appropriate tag to the live broadcast video, the management platform may provide a function for playing video content of the live broadcast video, to help the reviewer determine a correspondence between the live broadcast content and the display location on the live broadcast theme page according to playing of the video content of the live broadcast video, to add the appropriate tag to the live broadcast video.

In an implementation, the management platform further displays a trigger entrance of the video content of the live broadcast video. The trigger entrance may be a live broadcast cover of the live broadcast video. When displaying the live broadcast video, the management platform further displays the trigger entrance of the video content of the live broadcast video. When the trigger entrance of the video content of the live broadcast video is triggered, the video content of the live broadcast video is played on the management platform.

Referring to FIG. 2D, FIG. 2D is a schematic diagram of a review interface displayed on a management platform according to an embodiment of this application. In FIG. 2D, each live broadcast video includes a room number, a room name, a live broadcast theme name, a nickname of an anchor, an account number of the anchor, a recorded video status, a room configuration status, a live broadcast status of the room, a geographic location, a total quantity of likes for the room, a total quantity of awards for the room, a total quantity of online persons in the room, a quantity of historical audiences in the room, a start time, a room right, a live broadcast cover, and a recommendation location. The recommendation location limits the tag option of the tag. When a reviewer triggers a live broadcast cover of a live broadcast video, the management platform plays video content of the live broadcast video. In this way, the reviewer may determine whether to add a tag and add which tag to the live broadcast video according to the played video content. With reference to FIG. 2C, in the live broadcast theme page, a priority of a tag 1 is higher than a priority of a tag 2, and a priority of the tag 2 is higher than a priority of a tag 3. If the reviewer determines that a priority of the video content of the live broadcast video is relatively high, the tag 1 may be added to the live broadcast video. In this case, the reviewer may select, according to a recommendation location corresponding to the live broadcast video, a tag option whose value is 1. After a tag confirmation control corresponding to the live broadcast video is triggered, the management platform may obtain a tag corresponding to the tag option selected for the live broadcast video.

That is, in an actual application, the tag is added by a reviewer, after the reviewer reviews video content of a live broadcast video, according to a correlation between the video content and a display location on a live broadcast theme page.

When obtaining a plurality of tags of the plurality of live broadcast videos and respectively adding the plurality of tags to the plurality of live broadcast videos, the operation background may further automatically add the tags to the live broadcast videos. In an example implementation, refer to descriptions of step 204 and step 205.

Step 204: Obtain a type corresponding to the live broadcast video.

In an actual application, when obtaining the type corresponding to the live broadcast video related to the live broadcast theme, the operation background may obtain the type corresponding to the live broadcast video according to a preset manner. The type herein is a type preconfigured for the live broadcast theme.

The preset manner herein may be performing voice identification for the live broadcast video, performing key word identification for text information in the live broadcast video, and key information identification for description information of the live broadcast video, and the like.

When the preset manner is performing voice identification for the live broadcast video, the voice identification is performed for the live broadcast video, and the type to which information obtained from the voice identification belongs is determined according to types preconfigured for the live broadcast theme. Using an example in which the live broadcast theme is delicacy cooking, the types preconfigured for the live broadcast theme are respectively a dessert, a fried dish, and a soup. The operation background may identify voice of an anchor in the live broadcast video, obtain a key word from the voice of the anchor, and determine the type corresponding to the key word. For example, when the key word is "cream", the corresponding type is the dessert. For another example, when the key word is "oil temperature", the corresponding type is the fried dish.

When the preset manner is performing key word identification for text information in the live broadcast video, the key word identification is performed for the text information in the live broadcast video, and the type corresponding to an identified key word is determined according to types preconfigured for the live broadcast theme. The key word herein is a word in a preconfigured key work library corresponding to the live broadcast theme. Using an example in which the live broadcast theme is delicacy cooking, the types preconfigured for the live broadcast theme are respectively a dessert, a fried dish, and a soup. The operation background identifies text information in a frame image included in the live broadcast video, obtains the key word, such as "cream" or "oil temperature", related to the live broadcast theme, and then determines the type corresponding to the key word.

When the preset manner is performing key information identification for description information of the live broadcast video, the key information identification is performed for the description information of the live broadcast video, and the type corresponding to identified key information is determined according to types preconfigured for the live broadcast theme. The key information herein is information in a preconfigured key information library corresponding to the live broadcast theme. Using an example in which the live broadcast theme is delicacy cooking, the types preconfigured for the live broadcast theme are respectively a Jiangsu province competition area, a Zhejiang province competition area, and a Shanghai competition area. The operation background may obtain the key information of the description information of the live broadcast video. For example, if the key information is a geographic location, the preconfigured type corresponding to the geographic location is determined according to the geographic location. For example, if the geographic location is within the Jiangsu province, the corresponding type is the Jiangsu province competition area.

In some embodiments, to reduce subsequent screening workload of push personnel, before obtaining the types corresponding to the live broadcast videos related to the live broadcast theme, the operation background may further sort the live broadcast videos related to the live broadcast theme, screen out a preset quantity of live broadcast videos ranked high, and then perform a step of obtaining the types corresponding to the live broadcast videos. A possible value of the preset quantity may be 1000, 2000, 2300, or the like.

The preset quantity herein may be preset according to factors such as a total quantity of live broadcast videos participating in the live broadcast theme and duration of an activity corresponding to the live broadcast theme. For example, the preset quantity may be a quantity of live broadcast videos corresponding to a preset ratio of the total quantity of live broadcast videos participating in the live broadcast theme. For another example, when the duration of the activity corresponding to the live broadcast theme is relatively long, the preset ratio may further be adjusted to be higher.

Step 205: Add a tag corresponding to the type to the live broadcast video, and obtain the tag that is successfully added to the live broadcast video.

The operation background prestores a correspondence between types corresponding to live broadcast themes and tags. After obtaining the types corresponding to the live broadcast videos related to the live broadcast theme, the operation background adds the tag corresponding to the type to the live broadcast video according to the correspondence between the prestored correspondence between the types and the tags.

When automatically adding the tags to the live broadcast videos, the operation background may further add the tags to the live broadcast videos related to the live broadcast theme in sequence according to a preset sequence of the tags. For example, the preconfigured tags related to the live broadcast theme include a tag 1 to a tag 5, and the tags are added to the live broadcast videos related to the live broadcast theme in sequence according to a sequence from the tag 1 to the tag 5. For example, a first to a fifth live broadcast videos related to the live broadcast theme are respectively added with the tag 1, the tag 2, the tag 3, the tag 4, and the tag 5, and a sixth to a tenth live broadcast videos related to the live broadcast theme are respectively added with the tag 1, the tag 2, the tag 3, the tag 4, and the tag 5, and the rest can be deduced by analogy.

Correspondingly, after adding the tag to the live broadcast video, the operation background may obtain the tag that is successfully added to the live broadcast video related to the live broadcast theme.

Step 206: Select at least one of the live broadcast videos added with the tags as a target live broadcast video, and push the selected target live broadcast video to a live broadcast theme page in real-time, the target live broadcast video being played at a corresponding display location on the live broadcast theme page.

Generally, for any tag, when there is a relatively large quantity of management platforms, there may be a relatively large quantity of live broadcast videos added with the tag. To make the live broadcast video in a high correlation with the live broadcast theme display at a display location corresponding to the tag on the live broadcast theme page in time. In this application, the push personnel select a live broadcast video that needs to be pushed from the live broadcast videos added with the tag. In this case, when the live broadcast video is added with the tag by a reviewer on the management platform, the management platform sends the live broadcast video added with the tag to the push platform of the operation background. The push personnel on the push platform selects the to-be-pushed live broadcast video added with the tag, and the operation background pushes the to-be-pushed target live broadcast video that is selected by the push personnel to the live broadcast theme page.

In an implementation, the pushing, by the operation background, the screened-out target live broadcast video added with the tag to the live broadcast theme page may include the following steps:

S1: For each tag, when receiving a request for viewing the tag, display live broadcast videos that are added with the tag and that are related to the live broadcast theme.

To facilitate operations of the push personnel, the push platform may receive the live broadcast videos added with the tag that are sent by the management platforms related to the live broadcast theme, and display these live broadcast videos on a push page. When needing to push the live broadcast video to a location on the push page of the live broadcast theme, the push personnel may select to view the tag corresponding to the location, that is, the push personnel may select to view a specified tag.

Referring to FIG. 2E, FIG. 2E is a schematic diagram of a push page according to an embodiment of this application. When the push personnel enters 3 in a recommendation location search box on the push page of the live broadcast theme, the push page displays live broadcast videos with a tag value 3 that are related to the live broadcast theme.

S2: selecting the target live broadcast video from the displayed live broadcast videos added with the tag.

The push personnel may select a live broadcast video that finally needs to be pushed from the displayed live broadcast videos added with the specified tag, and the selected to-be-pushed target live broadcast video may be displayed in a preview area of the push page.

Still referring to FIG. 2E, the selected target live broadcast video is displayed in a preview area 22 of the push page.

S3: After receiving a push instruction, push the target live broadcast video to the live broadcast theme page.

After a publishing control on the push page is triggered, the push platform determines that the push instruction is received. In this case, the push platform pushes the selected live broadcast video to the live broadcast theme page.

In an actual application, the push personnel may select a plurality of live broadcast videos for a same recommendation location, but only one live broadcast video of a live broadcast can be played at a recommendation location on the live broadcast theme page at a moment. Therefore, for a same recommendation location, the push platform may determine a to-be-pushed target live broadcast video from target live broadcast videos according to a push rule corresponding to a tag of the recommendation location, and push the determined target live broadcast video to the live broadcast theme page.

During actual implementation, maintenance personnel of the operation background presets push rules corresponding to the tags, and after the setting of the maintenance personnel, the operation background or the push platform stores the push rules corresponding to the tags. Referring to FIG. 2F, FIG. 2F is a schematic diagram of configuring a push rule for a tag according to an embodiment of this application. In FIG. 2F, a push rule configured for a tag 1 configured for a live broadcast theme qixi is that a live broadcast video during live broadcast has a high priority. Live broadcast videos are ordered in descending order of newest publishes of live broadcast rooms, and the live broadcast video ranked high may be pushed.

Therefore, when the push platform pushes a selected live broadcast video to a live broadcast theme page, if one target live broadcast video is selected, the selected target live broadcast video is pushed to the live broadcast theme page; or if at least two target live broadcast videos are selected, the at least two selected target live broadcast videos are pushed to the live broadcast theme page according to a preset push rule corresponding to the tag.

In an implementation, the push platform first sorts the at least two selected live broadcast videos according to the preset push rule corresponding to the tag, and pushes the sorted target live broadcast videos to the live broadcast theme page in sequence.

For example, when each time receiving a push instruction for a specified tag, the operation background pushes a next not-pushed live broadcast video to a live broadcast theme page according to sorting of selected live broadcast videos with the tag.

For another example, when live broadcast of a live broadcast video or playing of a live broadcast video that is pushed to a display location on a live broadcast theme page ends, the live broadcast theme page may send a notification carrying a tag corresponding to the display location to the operation background. After receiving the notification, the operation background pushes a next not-pushed live broadcast video to the live broadcast theme page according to sorting of selected live broadcast videos with the tag.

In conclusion, by means of the method for pushing a live broadcast video provided in the embodiments of this application, the tag is added to each live broadcast video related to the live broadcast theme, the screened-out target live broadcast video added with the tag is pushed to the live broadcast theme page in real-time, and the target live broadcast video is played at the video display location corresponding to the tag of the live broadcast video on the live broadcast theme page. Each live broadcast video of a live broadcast related to the live broadcast theme may be added with the tag, and each live broadcast video added with the tag may be pushed to the live broadcast theme page in real-time. Therefore, it is ensured that any live broadcast video of the live broadcast theme participated by any common user may be added to the live broadcast theme page, so that a live broadcast video push rate is improved, thereby implementing high-efficient and real-time operation of live broadcast content.

It should be additionally noted that in the foregoing embodiments, after a user participates in a live broadcast subject, an operation platform may collect statistics on historical live broadcast subjects participated by the user, determine a preference subject of the user according to the statistics result, and then provides a personalized service to the user according to the preference of the user. In some embodiments, the operation platform may recommend, to the user, a live broadcast video of the live broadcast subject preferred by the user; or push, to the user, an advertisement related to the live broadcast subject preferred by the user. For example, if the live broadcast subject preferred by the user is delicacy, the operation platform may push a delicacy program, a delicacy discount, and the like to the user.

It should be further noted that in the foregoing embodiments, the operation platform may further parse live broadcast videos of users, to obtain users who are broadcast similar live broadcast subjects. The operation platform aggregates live broadcast videos that are during live broadcast or that are historically broadcast, thereby implementing aggregation of the live broadcast videos of the similar live broadcast subjects of a live broadcast subject.

Apparatus embodiments of the present disclosure are provided below. For details not described below in detail, refer to the foregoing corresponding method embodiments.

Figure 3:
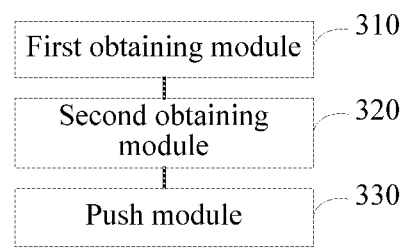
FIG. 3 is a schematic structural diagram of an apparatus for pushing a live broadcast video according to an embodiment of this application.

FIG. 3 is a schematic structural diagram of an apparatus for pushing a live broadcast video according to an embodiment of this application. The apparatus for pushing a live broadcast video may be implemented by using software, hardware, or a combination of hardware and software as an operation background or a part of the operation background. The apparatus for pushing a live broadcast video may include a first obtaining module 310, a second obtaining module 320, and a push module 330.

The first obtaining module 310 is configured to at least implement a function of step 201.

The second obtaining module 320 is configured to obtain tags added to the live broadcast videos obtained by the first obtaining module 310.

The push module 330 is configured to at least implement a function of step 206.

In an implementation, the second obtaining module 320 may include an allocation unit and a first obtaining unit.

The allocation unit is configured to at least implement a function of step 202.

The first obtaining unit is configured to at least implement a function of step 203.

In another implementation, the allocation unit may include a sorting subunit and an allocation subunit.

The sorting subunit is configured to sort the plurality of live broadcast videos that are obtained by the first obtaining module 310 and that are related to the live broadcast theme.

The allocation subunit is configured to allocate a preset quantity of live broadcast videos that are ranked high by the sorting subunit to the management platform.

In another implementation, the first obtaining unit may include a display subunit and an obtaining subunit.

The display subunit is configured to: display the plurality of allocated live broadcast videos on the management platform, and display a preset tag option and a preset tag confirmation control at each displayed live broadcast video location.

The obtaining subunit is configured to: for each live broadcast video, obtain the tag corresponding to the tag option selected for the live broadcast video after the tag confirmation control corresponding to the live broadcast video is triggered.

In another implementation, the management platform further displays a trigger entrance of the video content of the live broadcast video, and the video content includes frames of images in the live broadcast video, and the apparatus may further include a play module.

The play module may be configured to play the video content of the live broadcast video on the management platform after the trigger entrance of the video content of the live broadcast video that is displayed on the management platform is triggered.

In another implementation, the second obtaining module 320 may include a second obtaining unit and an adding unit.

The second obtaining unit is configured to at least implement a function of step 204.

The adding unit is configured to at least implement a function of step 205.

In another implementation, the push module 330 may include a display unit, a determining unit, and a push unit.

The display unit is configured to at least implement a function of step S1.

The determining unit is configured to at least implement a function of step S2.

The push unit is configured to at least implement a function of step S3.

In another implementation, the push unit may further be configured to: when at least two live broadcast videos are selected, push the selected live broadcast videos to the live broadcast theme page according to a preset push rule corresponding to the tag.

In another implementation, the push unit may further be configured to: sort the selected live broadcast videos according to a preset push rule corresponding to the tag, and push the sorted target live broadcast videos to the live broadcast theme page in sequence.

In conclusion, by means of the apparatus for pushing a live broadcast video provided in this embodiment of this application, the tag is added to each live broadcast video related to the live broadcast theme, the screened-out target live broadcast video added with the tag is pushed to the live broadcast theme page in real-time, and the target live broadcast video is played at the video display location corresponding to the tag of the live broadcast video on the live broadcast theme page. Each live broadcast video of a live broadcast related to the live broadcast theme may be added with the tag, and each live broadcast video added with the tag may be pushed to the live broadcast theme page in real-time. Therefore, it is ensured that any live broadcast video of the live broadcast theme participated by any common user may be added to the live broadcast theme page, so that a live broadcast video push rate is improved, thereby implementing high-efficient and real-time operation of live broadcast content.

When the apparatus for pushing a live broadcast video provided in the foregoing embodiment pushes a live broadcast video, division of the foregoing functional modules are only described as an example. In actual applications, the functions may be allocated, according to needs, to be implemented by different functional modules, that is, the internal structure of the operation background is divided into different functional modules to complete all or some of the foregoing described functions. In addition, the apparatus for pushing a live broadcast video provided in the foregoing embodiment and the embodiments of the method for pushing a live broadcast video belong to one concept. For a specific implementation procedure, refer to the method embodiments, and details are not described herein again.

Figure 4:
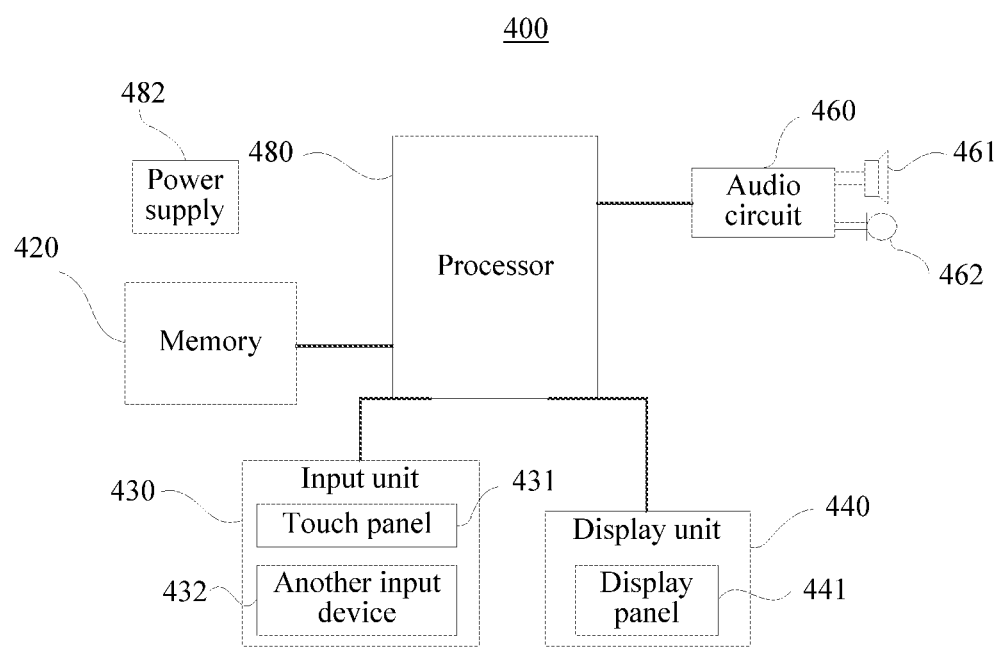
FIG. 4 is a schematic structural diagram of an apparatus for pushing a live broadcast video according to another embodiment of this application.

Referring to FIG. 4, FIG. 4 is a schematic structural diagram of an apparatus for pushing a live broadcast video according to another embodiment of this application. The apparatus 400 is configured to implement the method for pushing a live broadcast video provided in the foregoing embodiments. The apparatus 400 in this application may include one or more components as follows: a processor configured to execute a computer program instruction to complete various procedures and methods, a random access memory (RAM) and a read-only memory (ROM) that are configured to store information and a program instruction, a memory configured to store data and information, an I/O device, an interface, an antenna, and the like. Specifically:

The apparatus 400 may include components such as a memory 420, an input unit 430, a display unit 440, an audio circuit 460, a processor 480, and a power supply 482. A person skilled in the art may understand that the structure of the apparatus shown in FIG. 4 does not constitute a limitation to the terminal, and the apparatus may include more components or fewer components than those shown in the figure, or some components may be combined, or a different component deployment may be used.

Components of the apparatus 400 are specifically described with reference to FIG. 4.

The memory 420 may be configured to store a software program and a module. By running the software program and the module stored in the memory 420, the processor 480 performs various functional applications and data processing of the apparatus 400. The memory 420 may mainly include a program storage area and a data storage area. The program storage area may store an operating system, an application program required by at least one function (such as a sound playback function and an image display function), and the like. The data storage area may store data (such as audio data and an address book) created according to use of the apparatus 400, and the like. In addition, the memory 420 may include a high speed random access memory, and may further include a non-volatile memory such as at least one magnetic disk storage device, a flash memory, or another volatile solid-state storage device.

The input unit 430 may be configured to receive input digit or character information, and generate a keyboard signal input related to the user setting and function control of the apparatus 400. Specifically, the input unit 430 may include a touch panel 431 and another input device 432. The touch panel 431, which may also be referred to as a touchscreen, may collect a touch operation of a user on or near the touch panel (such as an operation of a user on or near the touch panel 431 by using any suitable object or accessory such as a finger or a stylus), and drive a corresponding connection apparatus according to a preset program. In some embodiments, the touch panel 431 may include two parts: a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into touch point coordinates, and sends the touch point coordinates to the processor 480. Moreover, the touch controller can receive and execute a command sent by the processor 480. In addition, the touch panel 431 may be a resistive, capacitive, infrared, or surface sound wave type touch panel. In addition to the touch panel 431, the input unit 430 may further include the another input device 432. Specifically, the another input device 432 may include, but is not limited to, one or more of a physical keyboard, a functional key (such as a volume control key or a switch key), a track ball, a mouse, and a joystick.

The display unit 440 may be configured to display information input by the user or information provided for the user, and various menus of the apparatus 400. The display unit 440 may include a display panel 441. In some embodiments, the display panel 441 may be configured by using a liquid crystal display (LCD), an organic light-emitting diode (OLED), or the like. Further, the touch panel 431 may cover the display panel 441. After detecting a touch operation on or near the touch panel 431, the touch panel 431 transfers the touch operation to the processor 480, so as to determine the type of the touch event. Then, the processor 480 provides a corresponding visual output on the display panel 441 according to the type of the touch event. Although, in FIG. 4, the touch panel 431 and the display panel 441 are used as two separate parts to implement input and output functions of the apparatus 400, in some embodiments, the touch panel 431 and the display panel 441 may be integrated to implement the input and output functions of the apparatus 400.

The audio circuit 460, a speaker 461, and a microphone 462 may provide audio interfaces between the user and the apparatus 400. The audio circuit 460 may convert received audio data into an electric signal and transmit the electric signal to the speaker 461. The speaker 461 converts the electric signal into a sound signal for output. On the other hand, the microphone 462 converts a collected sound signal into an electric signal. The audio circuit 460 receives the electric signal and converts the electric signal into audio data, and outputs the audio data to the processor 480 for processing. Then, the processor 480 sends the audio data to, for example, another terminal by using the RF circuit, or outputs the audio data to the memory 420 for further processing.

The processor 480 is the control center of the apparatus 400, and is connected to various parts of the apparatus by using various interfaces and lines. By running or executing the software program and/or module stored in the memory 420, and invoking data stored in the memory 420, the processor 480 performs various functions and data processing of the apparatus 400, thereby performing overall monitoring on the apparatus. In some embodiments, the processor 480 may include one or more processing units. The processor 480 may integrate an application processor and a modem processor. The application processor mainly processes an operating system, a user interface, an application program, and the like. The modem processor mainly processes wireless communication. It may be understood that the foregoing modem processor may alternatively not be integrated into the processor 480.

The apparatus 400 further includes the power supply 482 (such as a battery) for supplying power to the components. The power supply may be logically connected to the processor 480 by using a power management system, thereby implementing functions such as charging, discharging, and power consumption management by using the power management system.

In addition to one or more processors 480, the apparatus 400 further includes a memory and one or more programs. The one or more programs are stored in the memory, and are configured to be executed by the one or more processors. The one or more programs are used to implement the method for pushing a live broadcast video provided in the foregoing embodiments.

It should be additionally noted that when an operation background is a device having an information display function and a video play function and providing an operation function to background personnel, the apparatus 400 may be the operation background or a part of the operation background.

When the operation background includes a management platform, a push platform, and an allocation platform, the apparatus 400 may alternatively be the management platform or a part of the management platform; or may be the push platform or a part of the push platform; or may be the allocation platform or a part of the allocation platform. Obviously, when the apparatus 400 is the allocation platform or a part of the allocation platform, the apparatus may also include the input unit 430, the touch panel 431, the another input device 432, the display unit 440, the display panel 441, the audio circuit 460, the speaker 461, and the microphone 462.

An exemplary embodiment further provides a non-transitory computer-readable storage medium including an instruction. For example, the computer-readable storage medium stores at least one instruction, at least one segment of a program, a code set, or an instruction set, and the at least one instruction, the at least one segment of the program, the code set, or the instruction set being loaded and executed by a processor to implement the foregoing method for pushing a live broadcast video. For example, the non-transitory computer-readable storage medium may be a ROM, a random access memory (RAM), a CD-ROM, a magnetic tape, a floppy disk, an optical data storage device, or the like.

An exemplary embodiment further provides a computer program product. The product includes an instruction, and the instruction is executed to implement the method for pushing a live broadcast video in the embodiments of this application. In some embodiments, the product may include an instruction for obtaining a plurality of live broadcast videos related to a live broadcast theme, the live broadcast videos including any live broadcast video enabled after a participation entrance of the live broadcast theme is triggered;

an instruction for obtaining a plurality of tags of the plurality of live broadcast videos, the plurality of tags and a plurality of video display locations on a live broadcast theme page of the live broadcast theme being in a one-to-one correspondence;

an instruction for respectively adding the plurality of tags to the plurality of live broadcast videos;

an instruction for selecting at least one of the live broadcast videos added with the tags as a target live broadcast video; and an instruction for pushing the selected target live broadcast video to the live broadcast theme page in real-time, the target live broadcast video being played at a corresponding display location on the live broadcast theme page.

The sequence numbers of the foregoing embodiments of this application are merely for description purpose but do not indicate the preference of the embodiments.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely some embodiments of this application, but are not intended to limit this application. Any modification, equivalent replacement, or improvement made within the spirit and principle of this application shall fall within the protection scope of this application and its appended claims.

What is claimed is:

1. A method comprising:
   obtaining, by at least one processor, a plurality of live broadcast videos related to a live broadcast theme, each of the plurality of live broadcast videos being generated by a respective user who is a common, non-anchor user, having been enabled by the respective user for participation in the live broadcast theme and including an identifier of the live broadcast theme;
   obtaining, by the at least one processor, a plurality of tags, each tag corresponding to one-to-one to a pre-assigned video display location of a plurality of pre-assigned video display locations on a live broadcast theme page of the live broadcast theme;
   respectively adding, by the at least one processor, the plurality of tags to the plurality of live broadcast videos;
   selecting, by the at least one processor, at least one of the live broadcast videos to which the tags have been added as a target live broadcast video, based on the tags; and
   pushing, by the at least one processor, the selected target live broadcast video to the live broadcast theme page in real-time, the target live broadcast video being played at a corresponding display location on the live broadcast theme page.

2. The method according to claim 1, wherein the obtaining the plurality of tags and respectively adding the plurality of tags to the plurality of live broadcast videos comprises:
   allocating the plurality of live broadcast videos to a management platform of a plurality of management platforms, each of which manages to a live broadcast theme; and
   obtaining the tag added to each live broadcast video from the management platform, the tag being added according to a correlation between video content of the live broadcast video and the pre-assigned video display location of the live broadcast video on the live broadcast theme page.

3. The method according to claim 2, wherein the allocating comprises:
   sorting the plurality of live broadcast videos related to the live broadcast theme; and
   allocating a quantity of live broadcast videos that are ranked high to the management platform.

4. The method according to claim 2, wherein the obtaining a tag added to each live broadcast video from the management platform comprises:
   displaying the plurality of allocated live broadcast videos, a tag option of each live broadcast video, and a tag confirmation control of each live broadcast video on the management platform; and for each live broadcast video, obtaining the tag corresponding to the tag option selected for the live broadcast video after the tag confirmation control corresponding to the live broadcast video is triggered.

5. The method according to claim 4, wherein the management platform further displays a trigger entrance of the video content of the live broadcast video, and the video content includes frames of images in the live broadcast video, and after the displaying the plurality of allocated live broadcast videos, a tag option of each live broadcast video, and a tag confirmation control of each live broadcast video on the management platform, the method further comprises:
playing the video content of the live broadcast video on the management platform after the trigger entrance of the video content of the live broadcast video that is displayed on the management platform is triggered.

6. The method according to claim 1, wherein the adding the plurality of tags comprises:
obtaining a type corresponding to the live broadcast video; and
adding a tag corresponding to the type to the live broadcast video, and obtaining the tag that is successfully added to the live broadcast video.

7. The method according to claim 1, wherein the selecting comprises:
for each tag, in response to receiving a request for viewing the tag, displaying live broadcast videos to which the tag has been added and that are related to the live broadcast theme; and
selecting the target live broadcast video from the displayed live broadcast videos.

8. The method according to claim 1, wherein the pushing comprises:
when there are at least two target live broadcast videos, sorting the at least two target live broadcast videos according to a push rule corresponding to the tag, and pushing the sorted target live broadcast videos to the live broadcast theme page in sequence.

9. An apparatus comprising:
at least one memory configured to store computer program code; and
at least one processor configured to access the at least one memory and operate according to the computer program code, the computer program code including:
first obtaining code configured to cause at least one of the at least one processor to obtain a plurality of live broadcast videos related to a live broadcast theme, each of the plurality of live broadcast videos being generated by a respective user who is a common, non-anchor user, having been enabled by the respective user for participation in the live broadcast theme and including an identifier of the live broadcast theme;
second obtaining code configured to cause at least one of the at least one processor to obtain a plurality of tags of the plurality of live broadcast videos, each tag corresponding one-to-one to a pre-assigned video display location of a plurality of pre-assigned video display locations on a live broadcast theme page of the live broadcast theme;
adding code configured to cause at least one of the at least one processor to respectively add the plurality of tags to the plurality of live broadcast videos;
selecting code configured to cause at least one of the at least one processor to select at least one of the live broadcast videos to which the tags have been added as a target live broadcast video, based on the tags; and
pushing code configured to cause at least one of the at least one processor to push the selected target live broadcast video to the live broadcast theme page in real-time, the target live broadcast video being played at a corresponding display location on the live broadcast theme page.

10. The apparatus according to claim 9, wherein the computer program code comprises:
allocating code configured to cause at least one of the at least one processor to allocate the plurality of live broadcast videos to a management platform of a plurality of management platforms, each of which manages to a live broadcast theme; and
third obtaining code configured to cause at least one of the at least one processor to obtain a tag added to each live broadcast video from the management platform, the tag being added according to a correlation between video content of the live broadcast video and the pre-assigned video display location of the live broadcast video on the live broadcast theme page.

11. The apparatus according to claim 10, wherein the computer program code comprises:
sorting code configured to cause at least one of the at least one processor to sort the plurality of live broadcast videos related to the live broadcast theme; and
the allocating code is further configured to cause the at least one of the at least one processor to allocate a quantity of live broadcast videos that are ranked high to the management platform.

12. The apparatus according to claim 10, wherein the computer program code further comprises:
displaying code configured to cause at least one of the at least one processor to display the plurality of allocated live broadcast videos, a tag option of each live broadcast video, and a tag confirmation control of each live broadcast video on the management platform; and
fourth obtaining code configured to cause at least one of the at least one processor to, for each live broadcast video, obtain the tag corresponding to the tag option selected for the live broadcast video after the tag confirmation control corresponding to the live broadcast video is triggered.

13. The apparatus according to claim 12, wherein the management platform further displays a trigger entrance of the video content of the live broadcast video, and the video content includes frames of images in the live broadcast video, and the computer program code comprises:
playing code configured to cause at least one of the at least one processor to play the video content of the live broadcast video on the management platform after the trigger entrance of the video content of the live broadcast video that is displayed on the management platform is triggered.

14. The apparatus according to claim 9, wherein the adding code comprises:
type obtaining code configured to cause at least one of the at least one processor to obtain a type corresponding to the live broadcast video; and
tag adding code configured to cause at least one of the at least one processor to add a tag corresponding to the type to the live broadcast video, and obtain the tag that is successfully added to the live broadcast video.

15. The apparatus according to claim 9, wherein the computer program code comprises:
displaying code configured to cause at least one of the at least one processor to, for each tag, in response to receiving a request for viewing the tag, display live broadcast videos to which the tag has been added and that are related to the live broadcast theme; and selecting code configured to cause at least one of the at least one processor to select the target live broadcast video from the displayed live broadcast videos.

16. The apparatus according to claim 15, wherein the computer program code comprises:

sorting code configured to cause at least one of the at least one processor to, when there are at least two target live broadcast videos, sort the at least two target live broadcast videos according to a push rule corresponding to the tag, and push the sorted target live broadcast videos to the live broadcast theme page in sequence.

17. A non-transitory computer-readable storage medium storing computer program code which, when executed by at least one processor, executes operations comprising:

obtaining a plurality of live broadcast videos related to a live broadcast theme, each of the plurality of live broadcast videos being generated by a respective user who is a common, non-anchor user, having been enabled by the respective user for participation in the live broadcast theme and including an identifier of the live broadcast theme;

obtaining a plurality of tags of the plurality of live broadcast videos, each tag corresponding one-to-one to a pre-assigned video display location of a plurality of pre-assigned video display locations on a live broadcast theme page of the live broadcast theme;

respectively adding the plurality of tags to the plurality of live broadcast videos;

selecting at least one of the live broadcast videos to which the tags have been added as a target live broadcast video; and pushing the selected target live broadcast video to the live broadcast theme page in real-time, the target live broadcast video being played at a corresponding display location on the live broadcast theme page.

18. The computer-readable storage medium according to claim 17, wherein the obtaining the plurality of tags and respectively adding the plurality of tags comprises:

allocating the plurality of live broadcast videos to a management platform of a plurality of management platforms, each of which manages to a live broadcast theme; and obtaining a tag added to each live broadcast video from the management platform, the tag being added according to a correlation between video content of the live broadcast video and the pre-assigned video display location of the live broadcast video on the live broadcast theme page.

19. The computer-readable storage medium according to claim 18, wherein the allocating comprises:

sorting the plurality of live broadcast videos related to the live broadcast theme; and allocating a quantity of live broadcast videos that are ranked high to the management platform.

20. The computer-readable storage medium according to claim 18, wherein the obtaining a tag added to each live broadcast video from the management platform comprises:

displaying the plurality of allocated live broadcast videos, a tag option of each live broadcast video, and a tag confirmation control of each live broadcast video on the management platform; and for each live broadcast video, obtaining the tag corresponding to the tag option selected for the live broadcast video after the tag confirmation control corresponding to the live broadcast video is triggered.

\* \* \* \* \*